July 10, 1951     R. D. CONKLIN     2,560,088
ADJUSTABLE SWEEP ANGLE WINDSHIELD WIPER
Filed June 22, 1945     2 Sheets-Sheet 1
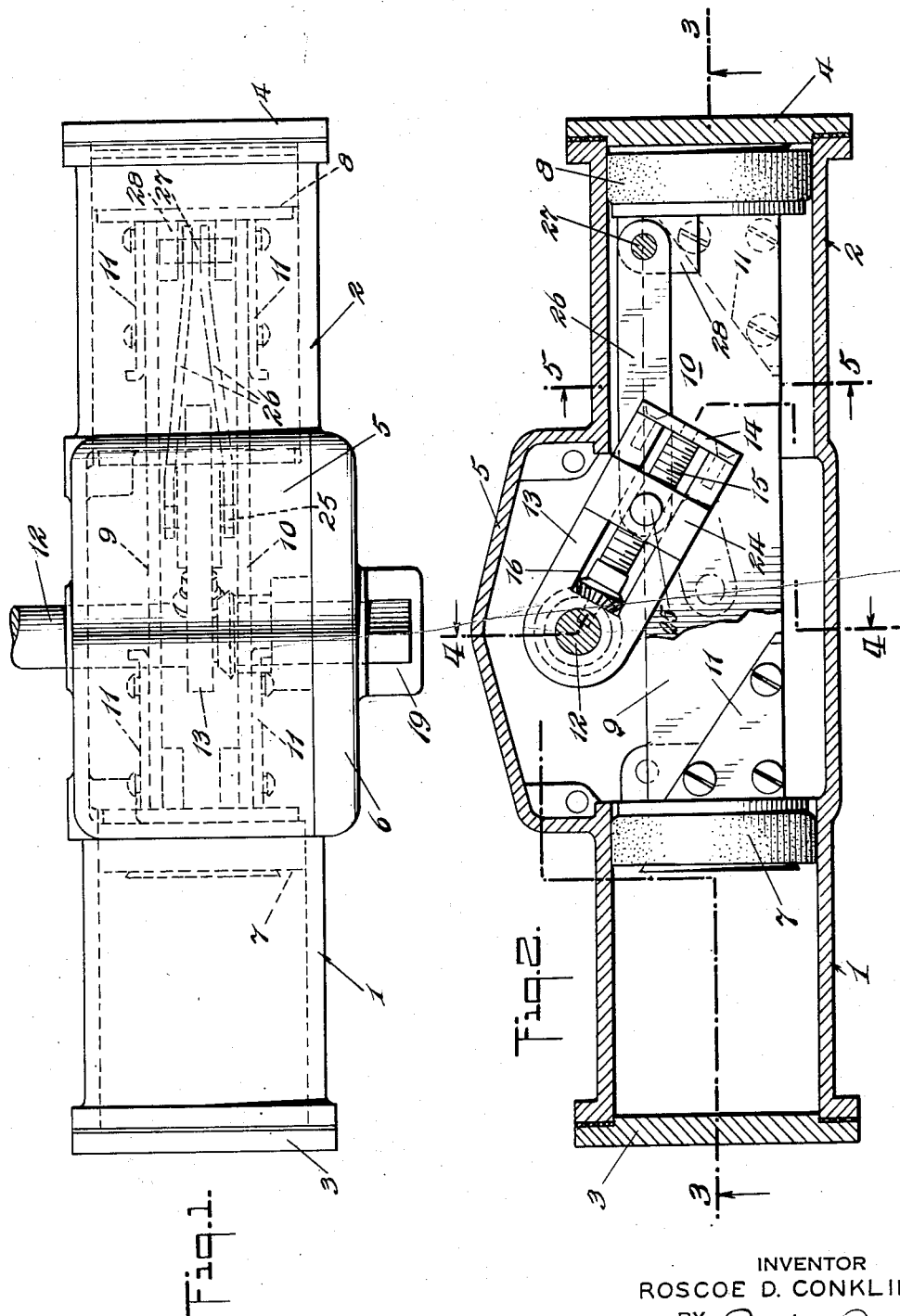
INVENTOR
ROSCOE D. CONKLIN
BY *Darby Darby*
ATTORNEYS July 10, 1951   R. D. CONKLIN   2,560,088
ADJUSTABLE SWEEP ANGLE WINDSHIELD WIPER
Filed June 22, 1945   2 Sheets-Sheet 2
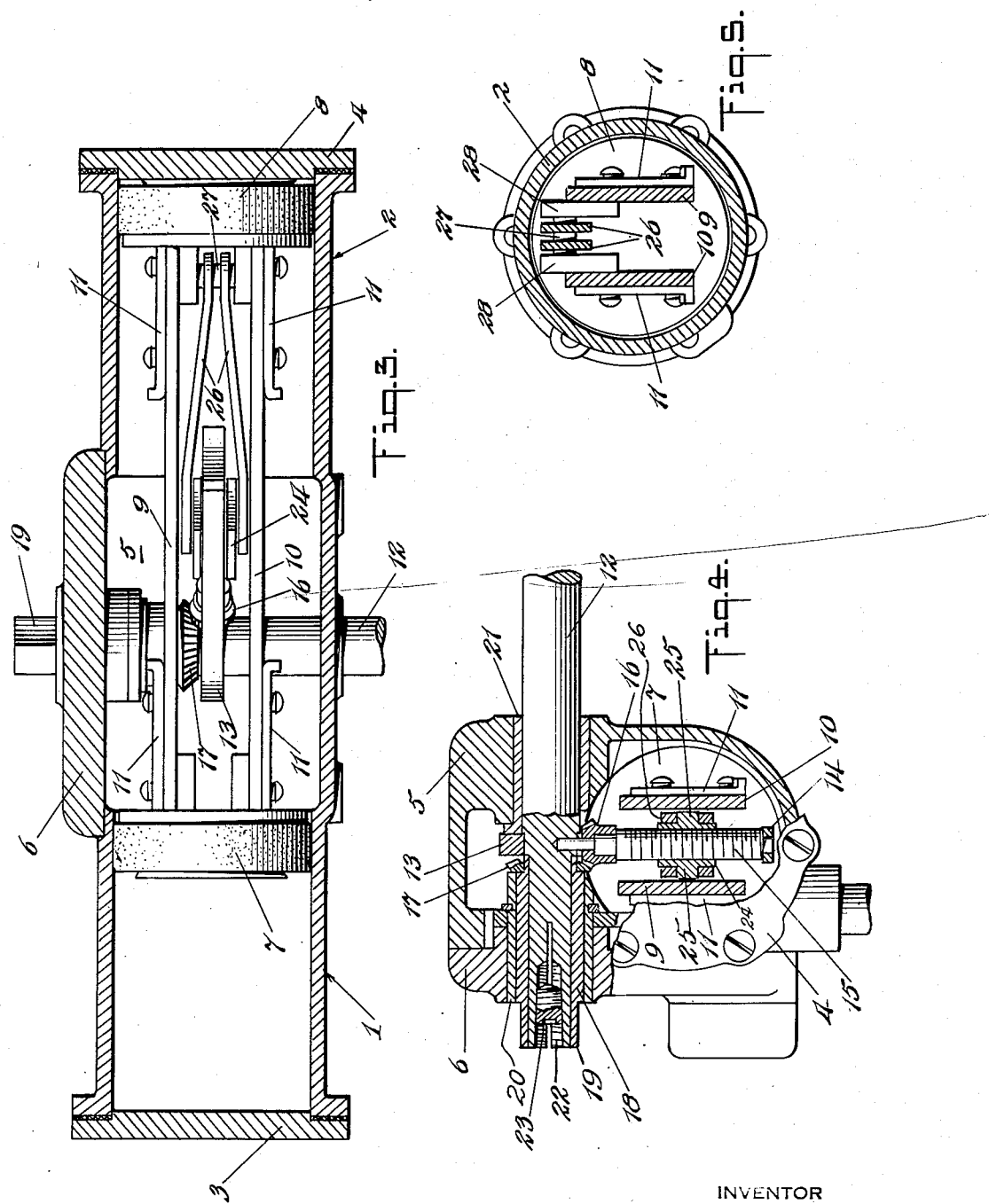
INVENTOR
ROSCOE D. CONKLIN
BY
ATTORNEYS.

Patented July 10, 1951

2,560,088

UNITED STATES PATENT OFFICE 2,560,088

ADJUSTABLE SWEEP ANGLE WINDSHIELD WIPER

Roscoe D. Conklin, Little Falls, N. J., assignor, by mesne assignments, to National Pneumatic Co., Inc., Boston, Mass., a corporation of Delaware Application June 22, 1945, Serial No. 601,036

3 Claims. (Cl. 74—600)

This invention relates to improvements in windshield wipers for vehicles of all kinds, with special reference to improvements for adjusting the angle of sweep of the wiper arm.

The invention comprises mechanism for the wiper blade arm of a windshield wiper capable of adjustment when the device is at a standstill or in operation, to effect adjustment, within limits, of the angle of sweep of the wiper.

Another object of the invention is to provide a mechanism of this type in which, throughout the range of adjustment, the wiper will move an equal distance on each side of its central position.

Other and more detailed objects of the invention will be apparent from the following description of the embodiment thereof shown in the attached drawings.

This invention resides substantially in the combination, construction, arrangement and relative location of parts, all as will be described in detail below.

In the accompanying drawings,

Figure 1 is a top plan view of a windshield wiper motor of the pressure fluid type to which this invention has been applied, and showing a portion only of the shaft upon which the wiper arm and the wiper are mounted;

Figure 2 is a longitudinal, vertical, cross-sectional view of the mechanism of Figure 1;

Figure 3 is a cross-sectional view, taken on the line 3—3 of Figure 2;

Figure 4 is a cross-sectional view taken on the line 4—4 of Figure 2; and

Figure 5 is a cross-sectional view taken on the line 5—5 of Figure 2.

It is common practice in the windshield wiper art at the present time to manufacture these devices with a preset angle of sweep through which the wiping blade is capable of moving. This sweep angle is usually specified by the user and is fixed. In normal practice the angle of sweep may lie in general within the range of 75 degrees to 120 degrees, which is the average range for the majority of users. It is, of course, obvious that a fixed sweep angle wiper is of limited utility, and it is therefore a broad object of this invention to provide a windshield wiper capable of adjustment of its sweep angle anywhere between the limits of the total possible range of movement of the wiper.

In accordance with an obviously desirable object, the mechanism herein disclosed is capable of sweep angle adjustment after installation of the windshield wiper on the vehicle or other place of use. Another advantage of the specific mechanism herein disclosed is that the sweep angle may be adjustable while the wiper is in actual operation.

The subject matter of the invention is shown in connection with a pressure fluid operated type of windshield motor, but as the description is completed, it will be seen that the subject matter of the invention may be applied to windshield wipers driven by other types of power, as, for example, electrically driven wipers and even manually driven wipers. It will also be clear that the subject matter of the invention is not necessarily limited to use in connection with windshield wipers.

As illustrated, the wiper includes a pair of aligned cylinders 1 and 2 supported in alignment by means of a central housing 5. The outer flanged end of cylinder 1 is closed by means of a cap 3 and sealed by means of a gasket, as shown. Similarly the outer flanged end of cylinder 2 is closed by means of the removable cap 4 and sealed with a suitable gasket, as shown. The central housing 5 is constructed with an open side which is closed by means of a removable cover 6 (see Figs. 1 and 4). Mounted in the cylinders 1 and 2 respectively are a pair of pistons 7 and 8 which are rigidly united for conjoint movement by a pair of links or plates 9 and 10 reinforced at their ends by means of the triangular plates 11 and all attached together by means of screws, as shown. The plates 9 and 10 lie in parallel relation.

Journaled in the housing portion 5 and extending transversely of the stroke direction of the piston assembly, is the wiper arm shaft 12 to be oscillated by the movement of the pistons. The shaft 12 is caused to oscillate by the following mechanism. The shaft, as shown in Figure 4, is provided with several sections of different diameters to form shoulders, and on one of them is mounted a U-shaped yoke 13 which is closed at its lower end by means of a plate or bar 14 attached in place by means of screws, as clearly shown in Figure 2. A threaded shaft or rod 15 is journaled at its lower end in the bar 14 and at its upper end in the shaft 12 (see Fig. 4).

Secured to the threaded rod 15 adjacent the shaft 12 for rotation with the rod, is a small bevel gear 16 which in turn meshes with a bevel ring gear 17 mounted on and secured to a sleeve 18 which fits on the portion of smallest diameter of shaft 12. The outer end of the sleeve 18 is of polygonal cross-section for a purpose to be described. The shaft 12 rotates in oilless bearing sleeves 20 and 21 secured in the cover 6 and housing 5 respectively, as clearly shown in Figure 4. As a matter of fact, the sleeve 18 is actually journaled in the bearing sleeve 21. The end of the shaft 12 on which the sleeve 18 is mounted is diametrally slotted for a distance, counterbored and threaded, as shown at 22 to receive a headless set screw 23. When the parts are in operating position the set screw 23 is driven down to the bottom of the threaded counterbore 22 and when drawn up tight sufficiently expands the split end of the shaft 12 to lock the sleeve 18 in place on it. Of course, this action is enhanced, as shown, by giving a slight taper to the threaded bore 22 so that as the headless screw 23 moves down into the bore, it expands the split end of the shaft 12 more and more.

An H-shaped cross-head 24 overlies the opposite faces of the arms of the U-shaped yoke 13, as is clear from several of the figures, and has a threaded passage therethrough in which the threaded rod 15 lies. Formed on the sides of the cross-head 24 are a pair of pintles 25 on which are pivotally mounted the ends of a pair of links 26. Links 26, in turn are pivotally connected to a pin 27 carried between ears 28 fixed to piston 8 adjacent thereto, the ends of the bars 9 and 10 are attached. Thus it will be immediately apparent that the movement of the piston assembly is transmitted to the shaft 12 from the piston 8 through the links 26, cross-head 24 and the yoke 13.

The manner in which the objects of this invention will be achieved will now be apparent, although a little description may be desirable. It will be seen that when the screw 23 is backed out of counterbore 22, the sleeve 18 will be released from the shaft 12. A suitable tool, as, for example, a wrench, when applied to the end 19 of the sleeve, will cause rotation of the sleeve on the shaft 12. Of course, rotation of this sleeve will cause the bevel ring gear 17 to rotate and that in turn will cause the threaded rod 15 to rotate through the interconnection of the bevel gear 16. Rotation of the threaded rod 15 will cause the cross-head to move closer to or further away from the shaft 12, depending upon the direction of rotation of the sleeve 18. It, of course, follows that the angle through which the shaft 12 will be rotated by the piston assembly will vary with the position of the cross-head on the yoke 13. The nearer the yoke is to the shaft 12 the greater will be the angle through which the shaft 12 will be rotated, and, conversely, the further away the cross-head 24 is from the shaft 12, the smaller will be the angle of oscillation of shaft 12. It will be seen that the parts are so interconnected and relatively arranged that the yoke 13 will move the same distance on each side of a vertical central line passing through shaft 12 (see Fig. 2) for all adjustments. Of course, after each new adjustment the set screw 23 will be driven home to lock the parts together for operation through the angle for which adjustment has been made.

From the above description it will be apparent to those skilled in the art that the subject matter of this invention is capable of embodiment in other physical forms, and I do not, therefore, desire to be limited to the single example herein illustrated.

What is claimed is:

1. In combination, a member, means for reciprocating the member, a shaft having a diametrically slotted end portion, and means for transferring the reciprocatory movement of the member into oscillatory movement of the shaft, the transferring means including means for effecting variation in the amplitude of the oscillatory movement, the variation effecting means including a sleeve carried by the shaft, means mounted internally of said shaft for exerting radially expanding pressure on said slotted end portion of said shaft and causing said sleeve normally to move with the shaft, an arm carried by the shaft, and means controlled by movement of the sleeve relatively to the shaft for varying the angular displacement of the arm and the shaft.

2. In combination, a member, means for reciprocating the member, a shaft having a diametrically slotted end portion, and means for transferring the reciprocatory movement of the member into oscillatory movement of the shaft, the transferring means including means for effecting variation in the amplitude of the oscillatory movement, the variation effecting means including a sleeve concentric with the shaft, means including an adjusting screw shiftable longitudinally of said slotted end portion to exert expanding pressure thereon and thereby causing said sleeve to oscillate normally with said shaft.

3. In a combination as disclosed, a shaft journaled for oscillation, said shaft having radially expansible end portions a reciprocatory power member adjacent said shaft, and means interconnecting said power member with said shaft including an adjusting mechanism for varying the angle of oscillation of said shaft for a constant cycle of movement of said power member, said last means including a threaded rod supported from said shaft, a cross-head mounted on said threaded rod, a connection from the cross-head to said power member, a gear mounted on said threaded rod, a second gear rotatably mounted on said shaft and engaging said first gear, and means cooperating with the radially expansible portions of said shaft for normally preventing relative rotation between said second gear and shaft.

ROSCOE D. CONKLIN.

REFERENCES CITED

The following references are of record in the file of this patent:

UNITED STATES PATENTS

| Number | Name | Date |
|---|---|---|
| 480,449 | Briggs | Aug. 9, 1892 |
| 659,079 | Lieb | Oct. 2, 1900 |
| 831,857 | Hackley | Sept. 25, 1906 |
| 1,120,833 | McElroy | Dec. 15, 1914 |
| 1,514,454 | Fullerton | Nov. 4, 1924 |
| 1,623,028 | Barett et al. | Mar. 29, 1927 |
| 1,809,430 | Van Duyn | June 9, 1931 |
| 2,319,485 | Alabrune | May 18, 1943 |
| 2,326,231 | Kraemer | Aug. 10, 1943 |

FOREIGN PATENTS

| Number | Country | Date |
|---|---|---|
| 89,250 | Sweden | May 11, 1937 |